July 21, 1959   K. E. STOBER ET AL   2,895,939
METHOD FOR COATING RUBBER IN GRANULAR FORM WITH IMPALPABLE
RESINOUS VINYL AROMATIC POLYMER DUSTS
Filed March 18, 1957
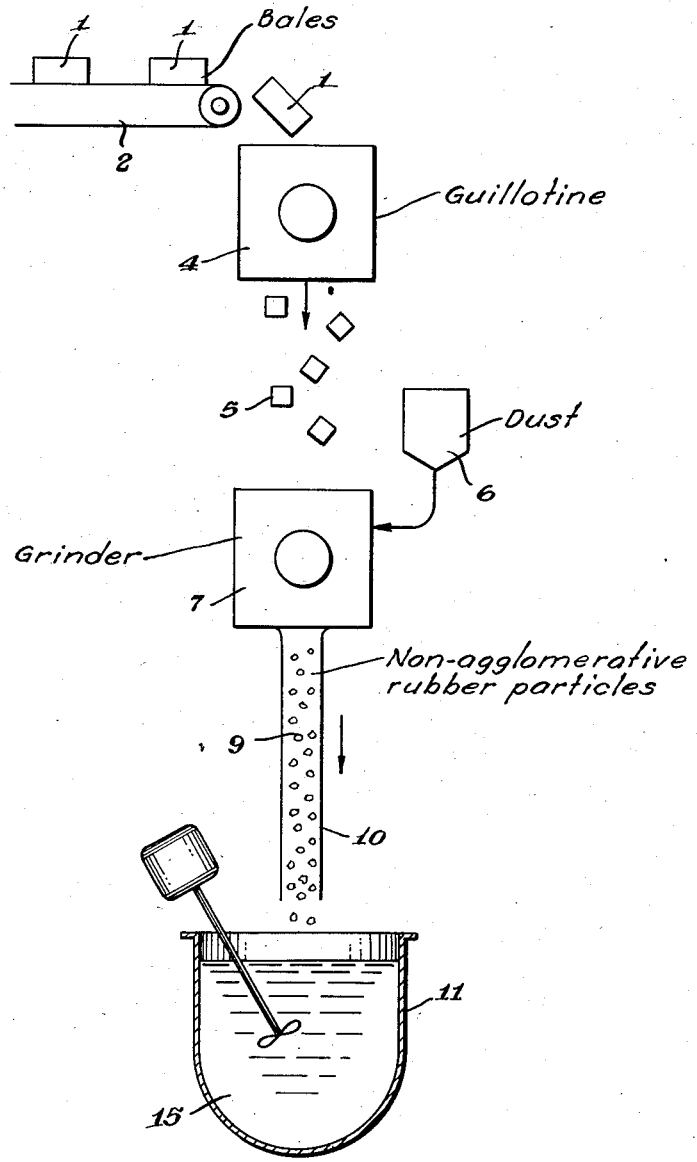
INVENTORS.
Kenneth E. Stober
Clifford H. Engwis
Theodore W. Dwight, Jr.
BY Griswold & Burdick
ATTORNEYS

United States Patent Office 2,895,939
Patented July 21, 1959

2,895,939

METHOD FOR COATING RUBBER IN GRANULAR FORM WITH IMPALPABLE RESINOUS VINYL AROMATIC POLYMER DUSTS

Kenneth E. Stober, Gales Ferry, Clifford H. Engwis, Norwich, and Theodore W. Dwight, Jr., Mystic, Conn., assignors to The Dow Chemical Company, Midland, Mich., a corporation of Delaware Application March 18, 1957, Serial No. 646,822

13 Claims. (Cl. 260—45.5)

Various rubber compositions, including both the natural and synthetic materials, are frequently utilized in and for the manufacture of rubber modified polymer or resin products. These include both physical blends of the rubber with other polymers and interpolymeric or graft copolymerized preparations. Thus, in the latter category, a rubber material may be dissolved in a suitable monomeric substance and the entire mixture polymerized to form useful and commercially valuable products. Many heat-resisting and high-impact polymer compositions may be prepared in this way.

As they are oftentimes obtained, both natural and synthetic rubbers are in the form of relatively large solid pieces or blocks that are commonly referred to as bales. Natural rubber is familiar in such structural shapes. Synthetic rubbers, including elastomeric copolymers of styrene and butadiene and the like are also commonly available in the form of bales into which they have been compressed for handling or shipment after they have been coagulated as "salted-out" crumbs from the emulsions in which they are manufactured.

Amongst the materials with which rubbers are most commonly blended are various vinyl aromatic compounds, especially such vinyl aromatic monomers as styrene, in order to prepare desirable interpolymerized graft copolymer products. In order to utilize rubber in bale form for intended blending purposes, it is a practical necessity to reduce its physical size to granular dimensions. This is ordinarily accomplished by comminuting the rubber bales by various milling, cracking, slicing, dicing or grinding procedures. The comminution of rubber involves difficult mechanical processing operations. In addition, freshly comminuted rubber is not easily handled due to its extreme tendency to knit together into a cohesive mass when it is in finely divided bulk form. Such conglomerates are often encountered when synthetic rubbers are comminuted, including that variety which is comprised of copolymerized styrene and butadiene. Synthetic rubbers frequently have highly pronounced characteristics of being tacky, viscid and agglomerative substances.

While talc and like materials are normally used to assist in the comminution of many rubbers and to reduce their tackiness when in particulate form, the efficacy of such materials could advantageously be improved upon for both of the indicated particulars. Furthermore, talcose rubber compositions are either extremely undesirable or completely intolerable for many applications. This is particularly the case when the rubbers are to be blended with other polymers or dissolved in other monomers for the manufacture of interpolymerized, rubber-modified, graft copolymer products and the like.

The chief aim and major concern of the present invention, therefore, is to provide an improved method for preparing rubber in a granulated form in which it can be easily handled and advantageously utilized for certain blending purposes. It is also an object of the invention to provide an improved method for comminuting and blending rubber with aromatic compounds, especially monomeric solvents of the indicated variety in order to obtain compositions suited for the manufacture of graft copolymerized products.

To the attainment of these and related ends, rubber may advantageously be prepared for blending by practice of the method in accordance with the present invention which comprises mechanically comminuting bales or the like large solid pieces of rubber in the presence of an impalpable resinous vinyl aromatic polymer dust to obtain granulated, discrete particles of the rubber or crumbs, that are uniformly provided with a surface application of the dust and are thus rendered non-agglomerative in nature. The finely divided, surface dusted rubber particles may advantageously be blended with various vinyl aromatic compounds to provide beneficial compositions for many purposes. Of extreme advantage is the fact that they may easily be blended in vinyl aromatic monomers by direct dissolution therein, without undesirable contamination of or harmful influence upon the resulting composition, especially when it is intended for employment in the preparation of rubber-modified, graft copolymerized products, or without requiring that extremely difficult and undesirable physical operations be involved for its purification. It is frequently desirable to prepare a synthetic rubber that consists essentially of a copolymer of styrene and butadiene in the practice of the invention in order to provide it in a non-agglomerative particulate form in which it can be stored and handled with little danger of its being knit together. In such form, the rubber is especially adaptable to being blended with vinyl aromatic compounds.

Beneficially, an amount of the impalpable resinous vinyl aromatic polymer dust that is between about 1 and 30 percent by weight, based on the weight of the resulting composition, may be interblended and ground with the rubber during its mechanical comminution in order to facilitate its being physically reduced in size and to provide the easily handleable, non-tacky, compatible dusted granular rubber compositions. In many cases, an amount of the dust between 2 and 10 percent by weight may be suitable and even more advantageously employed. The dust may be added to the solid bales being ground using conventional techniques for such purposes. For example, the quantity of dust that is to be employed may be made available with the bale at the point where comminution is to occur. As has been indicated, the comminution of the rubber in accordance with the present invention avoids the risk of the granular compositions being knit together into cohesive masses during handling and storage operations. It also adapts the compositions to be utilized without introduction of undesirable impurities or exertion of other deleterious influences for subsequent manufacturing processes that involve various vinyl aromatic monomers and polymers.

It is generally desirable to reduce the rubber in the comminution to as fine a physical state as may be obtained. Of course, it is axiomatic that the smaller the ultimate size in the comminuted rubber composition, the more power is required for its preparation and the less throughput or production rate can be achieved with given grinding apparatus. In general, the provision of lower rubber temperatures during the grinding operation ameliorates the grinding performance and facilitates the comminuting action. Usually for purposes of dissolving the rubber in a vinyl aromatic monomer it is desirable to comminute the bales or other large solid pieces to particles having an average diameter or other maximum size between about one-sixteenth and one inch. Preferably one-quarter inch or smaller particles are prepared. Any conventional rubber grinding apparatus may be employed in the practice of the invention including rotary knife cutters with fixed bed knife and screen or equivalent standard granulating equipment. Ordinarily, the employment of the impalpable resinous vinyl aromatic polymer dust during the grinding facilitates the flow of rubber in the grinding process and reduces bridging as compared to the grinding of unmodified rubber bales. It also permits the rubber particles to "float" more easily without "stacking" during the grinding process. This is a decided advantage when grinding at normal room temperatures is performed, especially during warmer weather. In addition, the polymer dust is mixed thoroughly with the rubber without requiring the use of auxiliary equipment. After the surface dusted, granulated compositions have been prepared, excess quantities of the dust may be shaken or screened off the particles prior to their subsequent blending or dissolution with a vinyl aromatic compound.

Any variety of normally solid resinous vinyl aromatic polymer which contains at least about 50 percent by weight of a vinyl aromatic compound in the polymer molecule may be utilized for the impalpable dust. Thus, finely divided copolymers of styrene or vinyl toluene with such monomers as methyl styrene, alpha-methyl styrene, acrylonitrile and the like may be employed as may impalpable dusts of analogous graft copolymers such as interpolymers of styrene with styrene/butadiene copolymers. When a copolymer dust is employed, care should be taken that it can be tolerated in and for the particular application that is intended for the rubber composition in which it is incorporated. For most purposes, it is most advantageous to employ an impalpable dust of polystyrene. However, in some cases, great benefit can also be secured when the dust is comprised of other vinyl aromatic resins. Thus, copolymer dusts of styrene and about 5 to 30 percent by weight of alpha-methyl styrene may be desirable when the rubber composition is to be utilized for the preparation of heat resisting graft copolymers. Likewise, dusts of chlorostyrene polymers and copolymers may be beneficial when the ultimate product is intended to be a high impact type of material.

In certain instances, however, it may be desirable to employ a relatively low molecular weight of polystyrene or other resinous vinyl aromatic polymer for the dust, such as a styrene polymer that has a molecular weight of at least about 20,000, to provide it with a dseirable resistance against becoming thermoplastified at temperatures up to as high as about 180° C. As is apparent, very high molecular weight polymers may also be employed. Advantageously, the dust which is employed has an extremely fine average particle size and smooth powder characteristics as may, for example, be obtained by micropulverising techniques. It is immaterial, in this connection, how fine a dust is employed and beneficial for at least about 50 percent by weight of the dust particles to have an average size finer than about 100 mesh in the U.S. standard sieve series. It may even be more advantageous at times for the dust to consist of at least about 50 percent by weight of particles having an average size which is finer than about 200 mesh. The sieve analysis of a typical polystyrene dust suitable for purposes of the present invention is as follows:

| Screen size (U.S. standard sieve series) | Percentage by weight of dust retained on screen |
| --- | --- |
| 40 | None |
| 80 | 0.6 |
| 100 | 0.1 |
| 150 | 14.0 |
| 200 | 51.4 |
| Pan (i.e., finer than 200 mesh) | 33.9 |

Polystyrene and other resinous vinyl aromatic polymers may be levigated to such fine powder form in various ways. They may, for example, be ground or ball milled or treated in a colloid mill in order to obtain such finely reduced characteristics. Advantageously, suitable powders may be obtained by spray drying a polystyrene or the like polymer material from a latex emulsion. The latter procedure is both convenient and economical while being a reliable technique for ensuring the preparation of satisfactory polystyrene dusts.

The polymers and, in particular, the monomers with which the dusted rubber compositions may advantageously (and in a conventional manner) be blended include the same varieties of vinyl aromatic compounds as have been above mentioned relative to the impalpable dusts. Generally, as has been mentioned, the dusted, ground rubber particles may advantageously be blended with or dissolved in styrene monomer for purposes of providing graft copolymer products.

By way of further illustration, taken in connection with the schematic illustration of the accompanying drawing representative of one embodiment of the invention, bales 1 of GRS type (i.e., butadiene/styrene copolymer) synthetic rubber that measured about five by fifteen by thirty-two inches and weighed approximately seventy-five pounds each were passed from a conveyor 2 to an automatic guillotine slicer 4 that cut them into smaller pieces 5 weighing about ten pounds each. From the guillotine the smaller pieces 5 were dropped at a controlled rate of about two to three hundred pounds per hour into a conventional 50 horsepower rotary knife type cutter 7 wherein, prior to and during the comminution they were interblended with about 10 percent by weight of a polystyrene dust from a supply source 6 having a molecular weight of about 20,000 and which consisted of at least about fifty percent by weight of particles having an average size smaller than about 100 mesh in the U.S. sieve series. Timing of the guillotine slicer 4 can advantageously be utilized to effectively control the subsequent grinding rate by directly passing the guillotine output to the grinder. The dusted, small rubber pieces 5 were ground into less than about one-half inch particle sizes at this rate using a three-eighths inch screen for this purpose. (Other particle sizes were also obtained during other runs of the equipment.) The ground particles 9 were then conveyed in a current of air through a suitable conduit 10 to an agitated dissolver 11 containing monomeric styrene 15 wherein solutions of about five percent by weight of the rubber in monomer (as ultimately controlled and determined by infra-red analysis) were readily prepared for subsequent graft copolymerization. The dust covered, ground rubber particles handled nicely through the system without tending to stick together or bridge at various points therein. The dissolving rates of the polystyrene dusted rubber particles in the styrene monomer at room temperature varied proportionally with particles size. For example, one-eighth inch particles dissolved in about seventy minutes; one-quarter inch particles in three hours and one-half inch particles in eight hours. The dissolution rate increased appreciably at higher temperatures. Thus, at 60° C., one-half inch particles dissolve in less than an hour. In any event, no impurities or intolerable insolubles were obtained in any of the resulting solutions. Excellent graft copolymer products were prepared from all such solutions that were made. In addition, storage of the polystyrene dusted ground rubber did not cause any agglomeration thereof or alter its easy handling and dissolving characteristics.

In contrast with the foregoing, granulated GRS rubber dusted with talc cannot be dissolved in styrene with satisfactoray results for purposes of preparing graft copolymers, due to the incompatibility of the talc and its harmful effect on the composition. The talc must first be removed from the solution before suitable polymerization can be accomplished. This is extremely tedious and difficult due to the extremely viscous nature of the rubber solution which is complicated by the presence of the talc therein. The separation usually requires to be accomplished by long and slow sedimentation techniques in large volume setting tanks. Talc removal by filtration or centrifugation are generally practical impossibilities, or at least unattractive procedures, for reasons, in large part, of the nature of the viscous, talc-containing material being handled. On the other hand, plain undusted GRS rubber, when ground into one-half inch particles, provided considerably much more difficulty in its handling during and after grinding and in its conveyance to the dissolver. Also, the dissolution of the undusted ground rubber was much more difficult, due to its tendency to agglomerate and form substantially larger size particles. And this tendency, as has been indicated, literally prohibits any storage or inventory stocking of undusted ground rubber compositions. Immediate blending after grinding is an undesirable practical necessity with undusted compositions.

What is claimed is:

1. Method for preparing solid bales of a rubber for subsequent blending with a vinyl aromatic compound which comprises mechanically comminuting said bales in the presence of an interblended impalpable resinous vinyl aromatic polymer dust selected from the group consisting of (a) polystyrene, (b) polyvinyltoluene, (c) polychlorostyrene, (d) copolymers of at least 50 weight percent of styrene and not more than 50 weight percent of at least one other monomer of the group consisting of methyl styrene, alpha-methyl styrene, chlorostyrene and acrylonitrile, (e) copolymers of at least 50 weight percent of vinyl toluene and not more than 50 weight percent of at least one other monomer of the group consisting of styrene, methyl styrene, alpha-methyl styrene, chlorostyrene and acrylonitrile, (f) copolymers of at least 50 weight percent of chlorostyrene and not more than 50 weight percent of at least one other monomer of the group consisting of styrene, methyl toluene, alpha-methyl styrene and acrylonitrile, and (g) mixtures thereof, to provide a substantially uniform surface coating of said dust on the comminuted rubber particles.

2. Method for preparing solid bales of a rubber for subsequently blending with a vinyl aromatic compound which comprises mechanically comminuting said bales to an average granular size of less than about one inch in the presence of between about one and thirty percent by weight, based on the weight of the resulting composition, of an interblended impalpable resinous vinyl aromatic polymer dust selected from the group consisting of (a) polystyrene, (b) polyvinyltoluene, (c) polychlorostyrene, (d) copolymers of at least 50 weight percent of styrene and not more than 50 weight percent of at least one other monomer of the group consisting of methyl styrene, alpha-methyl styrene, chlorostyrene and acrylonitrile, (e) copolymers of at least 50 weight percent of vinyl toluene and not more than 50 weight percent of at least one other monomer of the group consisting of styrene, methyl styrene, alpha-methyl styrene, chlorostyrene and acrylonitrile, (f) copolymers of at least 50 weight percent of chlorostyrene and not more than 50 weight percent of at least one other monomer of the group consisting of styrene, methyl toluene, alpha-methyl styrene and acrylonitrile, and (g) mixtures thereof, to provide a substantially uniform surface coating of said dust on the comminuted rubber particles.

3. The method of claim 2, wherein the rubber is comminuted in the presence of between about two and ten percent by weight of said dust.

4. The method of claim 2, wherein the rubber is comminuted to particles having an average size between about one-sixteenth and one inch.

5. The method of claim 2, wherein the resinous vinyl aromatic polymer dust has a molecular weight of not less than about 20,000.

6. The method of claim 2, wherein the rubber is a synthetic rubber consisting essentially of a copolymer of styrene and butadiene.

7. The method of claim 2, wherein the dust is comprised of a styrene polymer.

8. The method of claim 2, wherein the dust is comprised of polystyrene.

9. The method of claim 2, wherein the dust is comprised of a vinyl toluene polymer.

10. The method of claim 2, wherein the dust is comprised of a chlorostyrene polymer.

11. The method of claim 2, wherein at least about 50 percent by weight of the particles in the impalpable dust have an average particle size which is less than about 100 mesh in the U.S. sieve series.

12. A method in accordance with that set forth in claim 13, wherein said dusted rubber particles are comprised of a synthetic rubber copolymer of styrene and butadiene and are dusted with finely divided polystyrene and wherein said monomer in which said dusted particles are dissolved is styrene.

13. A method of dissolving, in a vinyl aromatic monomer that is interpolymerizable therewith, rubber in the form of solid bales that is soluble in said monomer which comprises mechanically comminuting said bales to an average granular size of less than about one inch in the presence of between about 1 and 30 percent by weight, based on the weight of the resulting composition, of an interblended impalpable resinous vinyl aromatic polymer dust selected from the group consisting of (a) polystyrene, (b) polyvinyltoluene, (c) polychlorostyrene, (d) copolymers of at least 50 weight percent of styrene and not more than 50 weight percent of at least one other monomer of the group consisting of methyl styrene, alpha-methyl styrene, chlorostyrene and acrylonitrile, (e) copolymers of at least 50 weight percent of vinyl toluene and not more than 50 weight percent of at least one other monomer of the group consisting of styrene, methyl styrene, alpha-methyl styrene, chlorostyrene and acrylonitrile, (f) copolymers of at least 50 weight percent of chlorostyrene and not more than 50 weight percent of at least one other monomer of the group consisting of styrene, methyl toluene, alpha-methyl styrene and acrylonitrile, and (g) mixtures thereof, to provide a substantially uniform surface coating of said dust on the comminuted rubber particles, then adding said surface dusted comminuted rubber particles to a vinyl aromatic monomer that is interpolymerizable therewith, dissolving said rubber and said surface coating dust in said monomer, then subsequently polymerizing said monomer in the presence of said rubber and dust that are dissolved therein.

References Cited in the file of this patent

UNITED STATES PATENTS

| | | |
|---|---|---|
| 2,269,660 | Griffin | Jan. 13, 1942 |
| 2,646,418 | Lang | July 21, 1953 |
| 2,673,844 | Gilcrease | Mar. 30, 1954 |